(12) United States Patent
Ouellette

(10) Patent No.: US 7,581,383 B2
(45) Date of Patent: Sep. 1, 2009

(54) ACOUSTIC PULSEJET HELMET

(75) Inventor: Richard P Ouellette, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 644 days.

(21) Appl. No.: 11/190,263

(22) Filed: Jul. 27, 2005

(65) Prior Publication Data

US 2007/0022740 A1 Feb. 1, 2007

(51) Int. Cl.
*F02K 5/02* (2006.01)
(52) U.S. Cl. .......................................... 60/247; 244/74
(58) Field of Classification Search .................. 60/247, 60/39.38, 39.76, 39.77; 244/74, 12.1, 12.3, 244/12.5, 23 A, 23 D, 53 R
See application file for complete search history.

(56) References Cited

U.S. PATENT DOCUMENTS

| | | | | |
|---|---|---|---|---|
| 2,587,100 A | * | 2/1952 | Black et al. ................... | 60/247 |
| 2,612,748 A | * | 10/1952 | Tenney et al. ................. | 60/266 |
| 2,612,749 A | * | 10/1952 | Tenney et al. ................. | 60/249 |
| 2,639,580 A | * | 5/1953 | Stuart .......................... | 60/249 |
| 2,674,091 A | * | 4/1954 | Malick ....................... | 60/39.77 |
| 2,710,524 A | * | 6/1955 | Frank et al. ................... | 60/786 |
| 2,715,436 A | * | 8/1955 | Lafferentz et al. ............. | 431/1 |
| 2,717,637 A | * | 9/1955 | Huber ........................... | 431/1 |
| 2,795,105 A | * | 6/1957 | Porter ......................... | 60/249 |
| 2,812,635 A | * | 11/1957 | Le Foll et al. ................. | 60/249 |
| 2,814,930 A | * | 12/1957 | Meulien et al. ............... | 60/249 |
| 2,912,821 A | * | 11/1959 | Horak ......................... | 60/249 |
| 2,919,542 A | * | 1/1960 | Servanty et al. ............... | 60/249 |
| 2,950,592 A | * | 8/1960 | Frank ......................... | 60/247 |
| 2,959,214 A | * | 11/1960 | Durr et al. ..................... | 431/1 |
| 3,005,310 A | * | 10/1961 | Reder .......................... | 60/249 |
| 3,264,824 A | * | 8/1966 | Bost .......................... | 60/39.78 |
| 3,456,441 A | * | 7/1969 | Graber ......................... | 60/247 |
| 3,462,955 A | * | 8/1969 | Graber et al. ................. | 60/249 |
| 3,517,510 A | * | 6/1970 | Melenric ..................... | 60/249 |
| 3,533,239 A | * | 10/1970 | Ghougasian ................. | 60/244 |
| 3,823,554 A | * | 7/1974 | Melenric ..................... | 60/249 |
| 3,848,408 A | * | 11/1974 | Tompkins .................... | 60/248 |

(Continued)

FOREIGN PATENT DOCUMENTS

GB 1113303 2/1918

(Continued)

OTHER PUBLICATIONS

U.S. Appl. No. 10/245,145, filed Sep. 16, 2002, Ouellette et al.

(Continued)

*Primary Examiner*—William H Rodriguez
(74) *Attorney, Agent, or Firm*—Harness, Dickey & Pierce, P.L.C.

(57) ABSTRACT

A pulsejet is provided that includes an inlet, an exhaust nozzle, and a combustion chamber between the inlet and the exhaust nozzle. The pulsejet additionally includes a flow-turning device positioned over an end of the inlet. The flow turning device forms an air flow pathway (AFP) having a substantially 180° turn. The 180° turn aligns a direction of exhaust exiting the combustion chamber through the inlet along a positive axial thrust line and substantially parallel with exhaust exiting the combustion chamber through the nozzle.

21 Claims, 14 Drawing Sheets

U.S. PATENT DOCUMENTS

| | | | | |
|---|---|---|---|---|
| 4,671,056 | A * | 6/1987 | Genz et al. | 60/39.77 |
| 4,767,314 | A * | 8/1988 | Mutchler | 431/1 |
| 6,824,097 | B1 * | 11/2004 | Ouellette et al. | 244/23 B |
| 6,883,304 | B2 * | 4/2005 | Ouellette | 60/247 |
| 7,051,510 | B2 * | 5/2006 | Ouellette | 60/204 |
| 7,427,048 | B2 * | 9/2008 | Ouellette | 244/74 |
| 2007/0022737 | A1 * | 2/2007 | Ouellette | 60/204 |

FOREIGN PATENT DOCUMENTS

| | | |
|---|---|---|
| GB | 793239 | 4/1958 |
| GB | 2180299 | 6/1985 |

OTHER PUBLICATIONS

U.S. Appl. No. 10/245,519, filed Sep. 16, 2002, Ouellette.
U.S. Appl. No. 10/872,154, filed Jun. 18, 2004, Ouellette.

* cited by examiner

ACOUSTIC PULSEJET HELMET

FIELD OF INVENTION

The invention relates generally to pulsejet engines and more particularly to valve-less pulsejet engines that direct all thrust forces along an axis of positive thrust.

BACKGROUND OF THE INVENTION

Pulsejet engines are extraordinarily simple devices that provide an inexpensive means to provide thrust for an aircraft. Most pulsejets typically include a mechanical valve to prevent air and thrust from escaping through the inlet of the pulsejet when combustions occur in the combustion chamber of the pulsejet. A main disadvantage of these pulsejets is that they generally have a low efficiency and the mechanical valves have a limited durability. Some more recent pulsejet designs have implemented a pneumatic air inlet valve that eliminates the durability problem of the mechanical inlet valve. The pneumatic air valve generally injected air into a throat section of the inlet nozzle as the fuel in the combustion chamber ignited. This created a high pressure zone at the inlet nozzle throat that prevented thrust from the fuel combustion from escaping out the inlet. Notwithstanding the removal of the mechanical valve and greatly improved durability, implementation of the pneumatic air valve required supplemental equipment to provide and inject the air into the inlet nozzle of the pulsejet. And, the amount and complexity of the additional supplemental equipment significantly increases as the number of pulsejets included in a system multiply.

Additionally, a typical bank of pulsejets would include a plurality of round pulsejets aligned in columns and rows. In this configuration, the pulsejets where interconnected using a webbing of orthogonal walls that formed a grid of square compartments with a single pulsejet within each compartment. The interconnected webbing adds considerable weight to each pulsejet bank and the space created by round pulsejets in square compartments created gaps that could allow a portion of the thrust generated by each pulsejet to escape in the wrong direction.

A need therefore exists for a pulsejet engine design that reduces maintenance, weight and complexity of existing designs while increasing the thrust efficiency.

BRIEF SUMMARY OF THE INVENTION

In various embodiments of the present invention, a pulsejet is provided that includes an inlet, an exhaust nozzle, and a combustion chamber between the inlet and the exhaust nozzle. The pulsejet additionally includes a flow-turning device positioned over an end of the inlet. The flow turning device forms an air flow pathway (AFP) having a substantially 180° turn. The 180° turn aligns a direction of exhaust exiting the combustion chamber through the inlet along a positive axial thrust line and substantially parallel with exhaust exiting the combustion chamber through the nozzle.

In various other embodiments, a method for providing vertical take off and landing propulsion for an aircraft is provided. The method includes providing at least one valve-less pulsejet integrated within a fuselage of the aircraft. The pulsejet includes a body having an inlet, an exhaust nozzle, a combustion chamber between the inlet and the exhaust nozzle. The method additionally includes positioning a flow-turning device over an end of the body to form an air flow pathway (AFP) having a substantially 180° turn. The 180° turn aligns a direction of exhaust exiting the combustion chamber through the inlet to be substantially parallel with exhaust exiting the combustion chamber through the nozzle along a positive axial thrust line.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention. Furthermore, the features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1A:
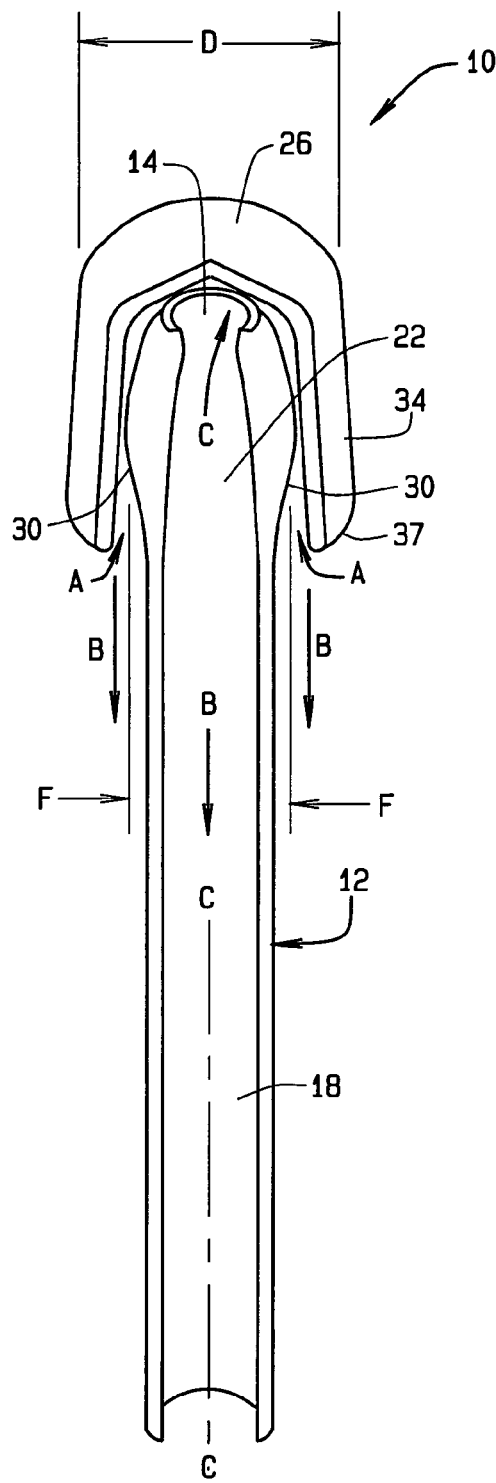
FIG. 1A is an isometric cross sectional view of the valve-less pulsejet engine, in accordance with various embodiments of the present inventions.
Figure 1B:
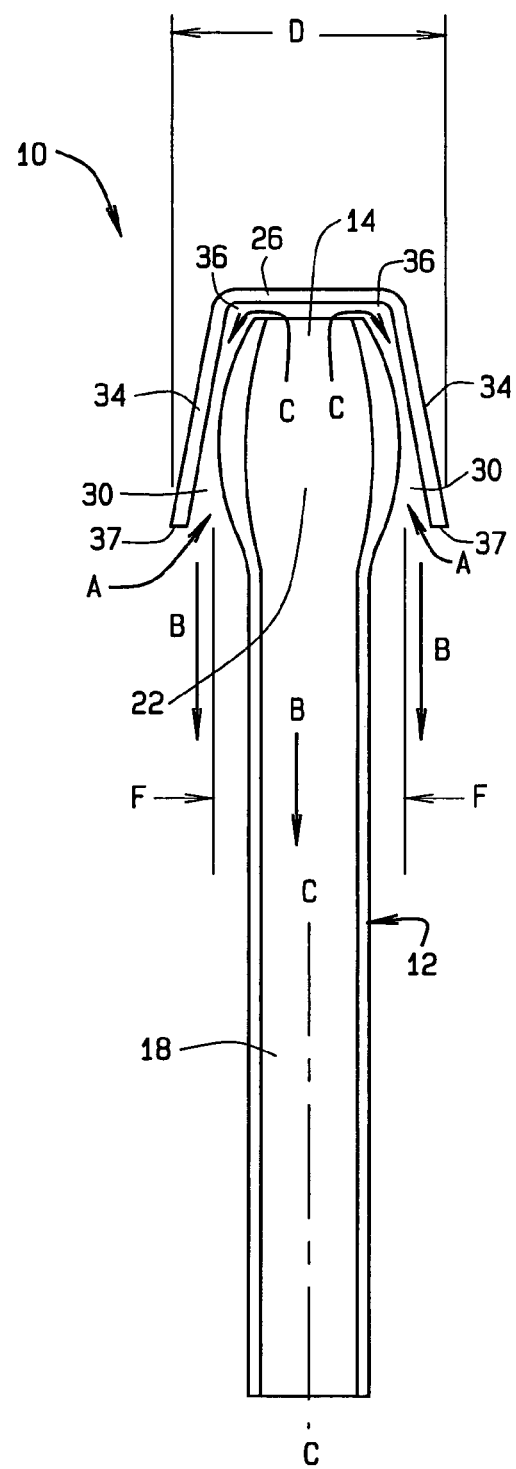
FIG. 1B is a cross sectional side view of the pulsejet engine shown in FIG. 1A.

FIGS. 1A and 1B are cross sections of the valve-less pulsejet engine, in accordance with various embodiments of the present inventions. The pulsejet engine will simply be referred to herein as the pulsejet 10. The pulsejet 10 includes a body 12 having an inlet 14, an exhaust nozzle 18, a combustion chamber 22 between the inlet 14 and the exhaust nozzle 18, and a flow turning device 26, herein referred to as a helmet 26, positioned over an end of the inlet 14. An air flow pathway (AFP) 30 through which air flows into and out of the pulsejet 10 is formed between a side wall 34 of the helmet 26 and an outer portion of the pulsejet 10 near combustion chamber 22 and the inlet 14. In various embodiments, as shown in FIG. 1, the AFP 30 is an annular AFP. In operation of the pulsejet 10, a propulsion cycle comprises an air intake phase, a compression phase and a combustion phase. Generally, during the compression phase, intake air flows through the AFP 30 in the A direction and enters the inlet 14. The intake air is mixed with fuel injected into the combustion chamber 22 and detonated during a combustion phase due to pressure created inside the combustion chamber 22. More particularly, initially air is injected into the combustion chamber 22 to mix with the injected fuel and an ignition source is provided to cause the air/fuel mixture to combust during at least one initial combustion phase. Each air/fuel combustion produces exhaust thrust that discharges from the exhaust nozzle 18 in B direction. This exhaust thrust will be referred to herein as the primary exhaust or primary thrust. Each combustion phase additionally produces exhaust thrust that exits the combustion chamber 22 through the inlet in the C direction. Thrust exiting the combustion chamber 22 through the inlet 14 of the pulsejet 10 will be referred to herein as secondary exhaust or secondary thrust.

Reflective pressure waves generated by each air/fuel combustion create pressures within the combustion chamber 22 that cause subsequent air/fuel mixtures to detonate during subsequent propulsion cycles. The propulsion cycle of a valveless pulsejet, such as pulsejet 10, is described in issued U.S. Pat. No. 6,824,097, titled "Vertical Takeoff And Landing Aircraft" and issued Nov. 30, 2004, which is herein incorporated by reference in its entirety. In various embodiments, the helmet 26 forms approximately a 180° turn section 36 in the AFP 30 such that turns the secondary exhaust thrust effectively 180° such that both the primary and secondary thrusts flow along an axis of positive thrust in the B direction that is approximately parallel with a pulsejet 10 longitudinal centerline C. Therefore, negative thrust problems of known pulsejet engines are eliminated without the need for additional devices or equipment, such as mechanical valves or large high pressure air injection systems. Additionally, the AFP 30 formed by the helmet 26 ensures that a path followed by inlet acoustic expansion/reflection waves is such that they meet returning nozzle acoustic expansion/reflection waves in the combustion chamber 22 to initiate new cycle ignition. After ignition, expansion waves exit the pulsejet 10 via the inlet 14 and the exhaust nozzle 18 causing reflection waves to travel through the inlet 14 and the nozzle 18 toward the combustion chamber 22. However, prior to ignition cool air is taken into the combustion chamber via the AFP 30, such that the inlet 14 maintains a much cooler temperature than the exhaust nozzle 18, which during operation can obtain a temperature of approximately 1500° F. Therefore, since the speed and distance traveled of the expansion/reflection wave is a function of temperature, it takes the expansion/reflection waves much more time to traverse through the cooler, shorter inlet 14 than through the hotter, longer nozzle 18. Thus, the inlet acoustic expansion/reflection waves meet returning nozzle acoustic expansion/reflection waves to provide self-sustained operation, i.e. self-sustained repetitive propulsion phases, of the pulsejet 10 at or near a resonant frequency.

Additionally, in various embodiments helmet 26 has an outside diameter D that is approximately 100% to 125% of an outside diameter F of the combustion chamber 22. Therefore, an overall diameter of installation of the pulsejet 10 is minimized such that installation of the pulsejet 10 in an aircraft, e.g. a VTOL aircraft, requires only a minimal amount of space. The helmet 26 and the inlet 14 are sized such that the entire AFP 30, including the 180° turn section 36, provides as much airflow gap as possible to increase the inlet airflow and improve performance of pulsejet 10. In various embodiments, the helmet 26 is formed such that the AFP 30 increases in area near a lip 37 of the helmet side wall 34. This allows more air to be drawn into the pulsejet and diffuses the secondary exhaust as it exits the AFP 30.

Figure 2:
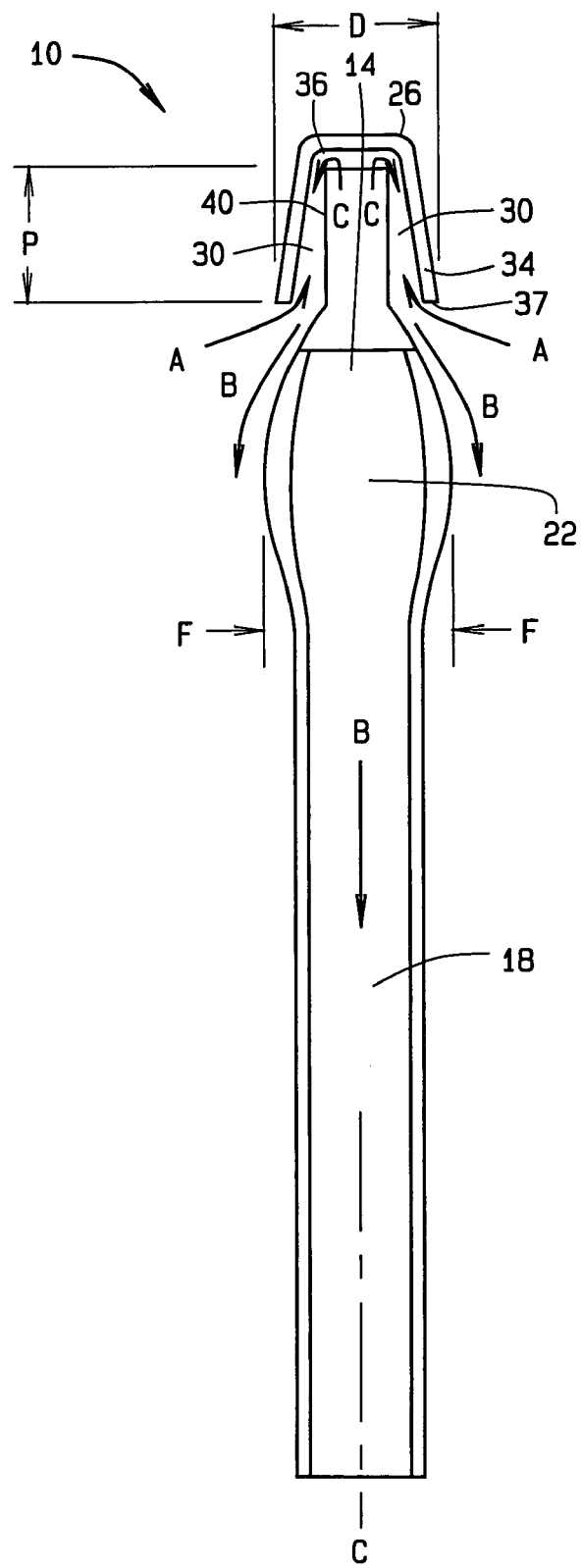
FIG. 2 is a cross sectional side view of the pulsejet engine shown in FIG. 1B including an elongated straight inlet section, in accordance with various embodiments of the present invention.

Referring to FIG. 2, in various embodiments the pulsejet 10 includes an elongated straight inlet section 40 extending from the inlet 14. The inlet section 40 provides a specified aspect ratio, i.e. inlet section length over inlet section diameter, for stable operation of the pulsejet. 10. The straight inlet section 40 creates an AFP 30 having an expanding area ratio as helmet side wall 34 extends toward the combustion chamber 22 and nozzle 18. That is, an annular area between the exterior of the inlet section 40 and the interior of the helmet side wall 34 increases from the open end, or inlet 14, of the inlet section 40 to an open end of the helmet side wall 34. Therefore, the expanding area ratio provide increase and improved air flow into the pulsejet 10 during the compression phase and also provides diffusion of secondary exhaust during the combustion phase that reduces or eliminates back pressure caused by a restrictive AFP 30. The length-to-diameter ratio of the inlet section 40 is configured to acoustically tune the inlet section 40 such that resonant waves will sustain operation, i.e. combustions, of the pulsejet 10 with no other combustion controls than fuel. That is, further artificial ignition, e.g. a glow plug or spark plug, is not required. A key critical resonant length P of the inlet section 40 extends from an inlet plane in the combustion chamber 22 to the lip 37 of the helmet side wall 34. The length P control the resonant frequency of the reflection waves that combust the air/fuel mixture in the combustion chamber 22. Furthermore, the straight inlet section 40 allows the outside diameter D of the helmet 26 to be minimized to provide a reasonably compact design that reduces the overall diameter of installation.

Figure 3A:
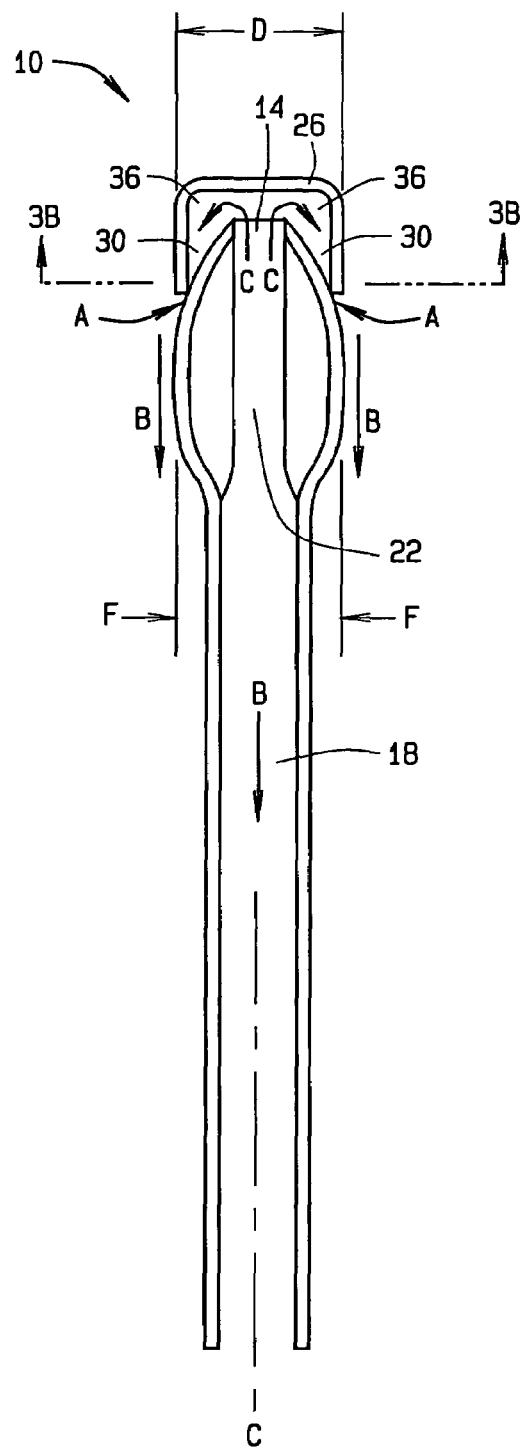
FIG. 3A is a cross sectional side view of the pulsejet engine shown in FIG. 1B including a cruciform shaped combustion chamber, in accordance with various embodiments of the present invention.
Figure 3B:
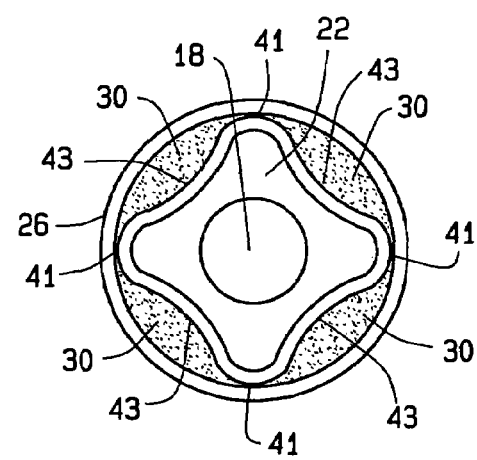
FIG. 3B is a cross sectional top view of the cruciform shaped combustion chamber shown in FIG. 3A, along line 3B-3B, having a flow-turning device positioned over an inlet of the pulsejet engine.

Referring now to FIGS. 3A and 3B, in various embodiments, the combustion chamber 22 has a non-cylindrical shape. For example, the combustion chamber 22 can have an elongated cruciform or star-like shape. The cruciform combustion chamber 22 includes a plurality of linear apexes 41 and linear valleys 43. The spaces between the interior of the helmet side wall 34 and the valleys 43 create a plurality of AFPs 30 that provide effectively unimpeded air intake flow and secondary exhaust flow. This reduces or eliminates back pressure caused by a restrictive AFP 30. In addition to providing the AFP 30s, the cruciform shaped combustion chamber 22 allows the outside diameter D of the helmet to be approximately equal to the outside diameter F of combustion chamber 22 at the widest point, i.e. from one apex peak 41 to an opposing apex peak 41. Therefore, the overall diameter of installation can be greatly reduced.

Figure 4:
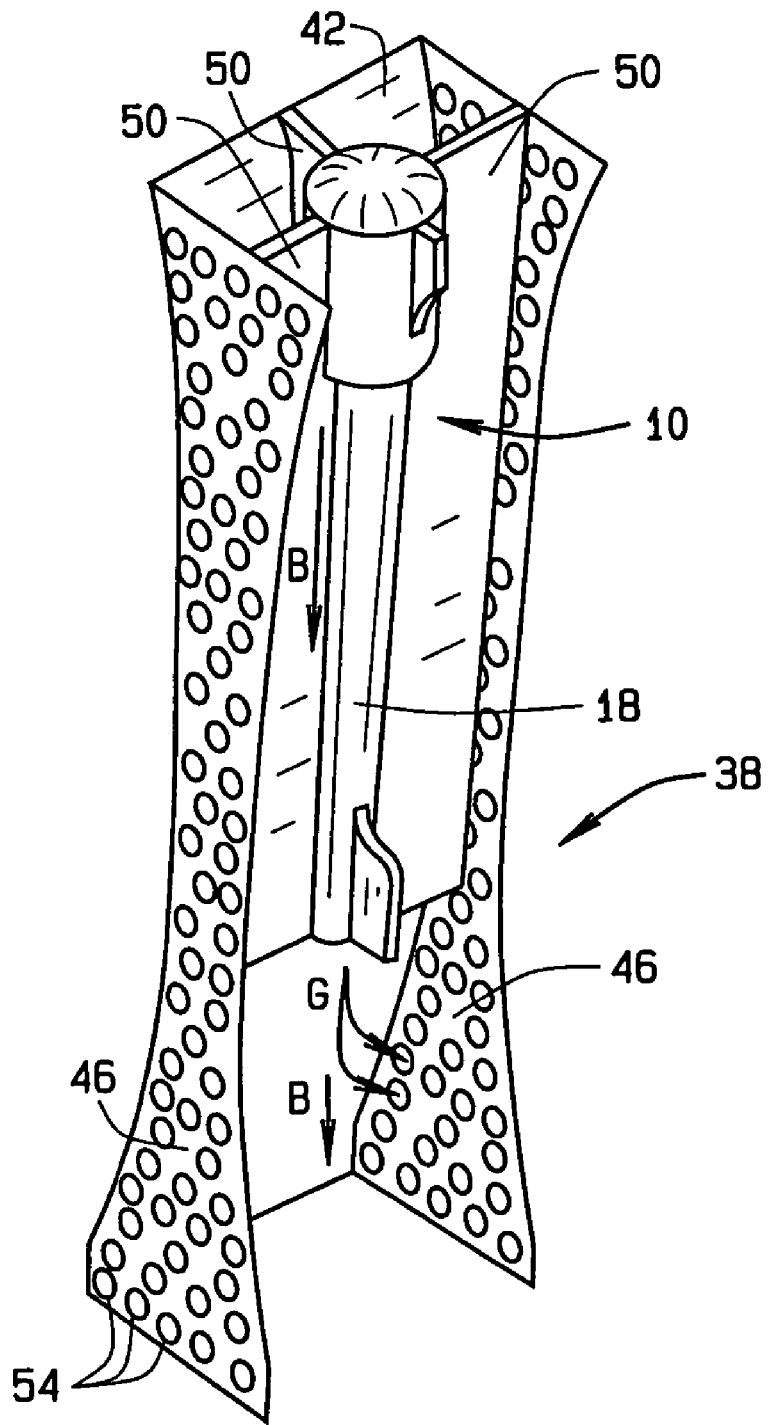
FIG. 4 is an isometric view of the pulsejet engine shown in FIG. 1A mounted within an augmentor cell, in accordance with various embodiments of the present invention.

Referring now to FIG. 4, in various embodiments, the pulsejet 10 is mounted within an augmentor cell 38. The augmentor cell 38 includes a pair of opposing entraining walls 42 adapted to entrain ambient air with the pulsejet primary and secondary exhausts to maximize propulsion thrust from the pulsejet 10. For clarity of illustration, one of the entrainment walls 42 has been removed from FIG. 2. The entrainment walls 42 can have any shape suitable to entrain the ambient air. For example, the entrainment wall 42 can be flat or curved, as shown in FIG. 4. The augmentor cell 38 additionally includes a pair of opposing side panels 46 connected to and substantially orthogonally between the entraining walls 42. The pulsejet 10 can be mounted within the augmentor cell 38 using any suitable mounting means, component, device or structure. For example, the pulsejet 10 can be mounted to one or more of the augmentor cell walls 42 and/or the side panels 46 using one or more of fairings 50. Although the fairings 50 are shown to extend along the entire length of the pulsejet 10, the fairing 50 can extend along a portion of each pulsejet 10 without altering the scope of the invention. In various embodiments, the side panels 46 include a plurality of apertures 54 adapted to allow a portion of the entrained air and the primary and secondary exhausts to exit the augmentor cell 38 in a cross flow direction G. It should be understood that any of the various embodiments described above in reference to FIGS. 1A, 1B, 2, 3A and 3B can be incorporated in the pulsejet augmentor cell 38.

Figure 5:
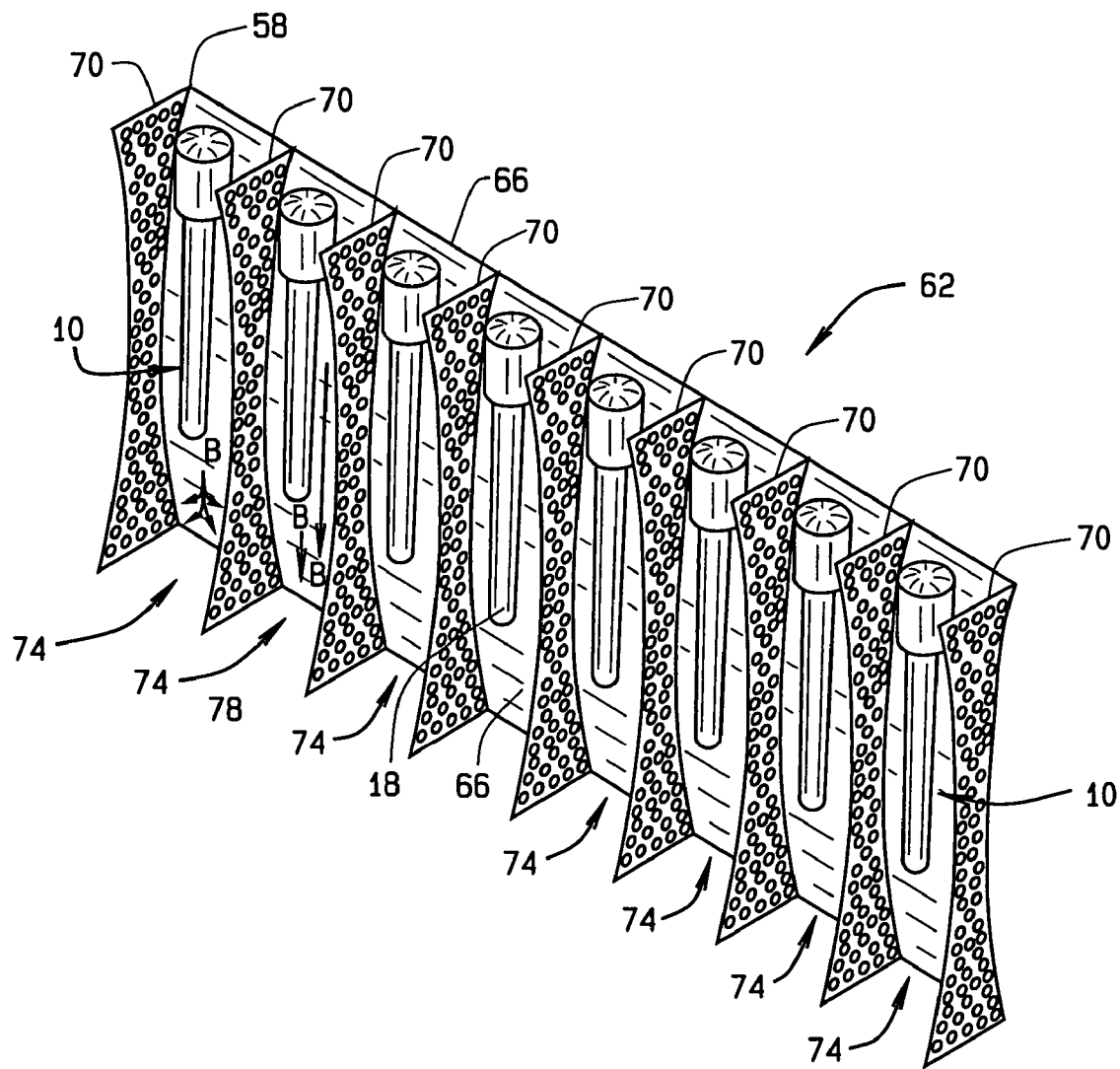
FIG. 5 is an isometric view of a plurality of the pulsejet engines shown in FIG. 1A mounted within a multi-bay augmentor to form a pulsejet augmentor bank, in accordance with various embodiments of the present invention.

Referring to FIG. 5, in various embodiments a plurality of pulsejets 10 are mounted within a multi-bay augmentor 58 to form a pulsejet augmentor bank 62. The pulsejet augmentor bank 62 includes a pair of opposing entraining walls 66 and a plurality of intercostals 70 connected to and substantially orthogonally between the entraining walls 66. For clarity of illustration, one bank entrainment wall 66 has been removed from FIG. 3. The plurality of intercostals 70 effectively subdivide the pulsejet augmentor bank 62 into a plurality of pulsejet augmentor bays 74 similar to the augmentor cell 38 described above with reference to FIG. 2. Analogous to the entrainment walls 42 of the augmentor cell 38 in FIG. 2, the bank entrainment walls 66 are adapted to entrain ambient air with the primary and secondary exhausts of each pulsejet 10 to maximize propulsion thrust from the pulsejets 10. Additionally, the bank entrainment walls 66 can have any shape suitable to entrain the ambient air, e.g. flat or curved, and each of the pulsejets 10 can be mounted within the respective augmentor bay 74 in any suitable manner, e.g. using one or more fairings such as fairing 50 shown in FIG. 4. Furthermore, in various embodiments, the bank intercostals 70 include a plurality of apertures 78 adapted to allow a portion of the entrained air and the primary and secondary exhausts of each pulsejet 10 to exit the respective augmentor bay 74 in a cross flow direction G. Therefore, the apertures 78 permit equalization of flow between each of the pulsejet primary and secondary exhaust flows such that any of the pulsejets 10 within the pulsejet augmentor bank 62 that operate above or below a nominal operating condition are equalized with the remaining pulsejet 10 primary and secondary exhaust flows. It should be understood that any of the various pulsejet 10 embodiments described above in reference to FIGS. 1A, 1B, 2, 3A and 3B can be incorporated in the pulsejet augmentor bank 62.

Exemplary embodiments of the pulsejet augmentor cell 38 and the pulsejet augmentor bank 62 are described in issued U.S. Pat. No. 6,824,097, titled "Vertical Takeoff And Landing Aircraft", issued Nov. 30, 2004, which is herein incorporated by reference in its entirety.

Figure 6:
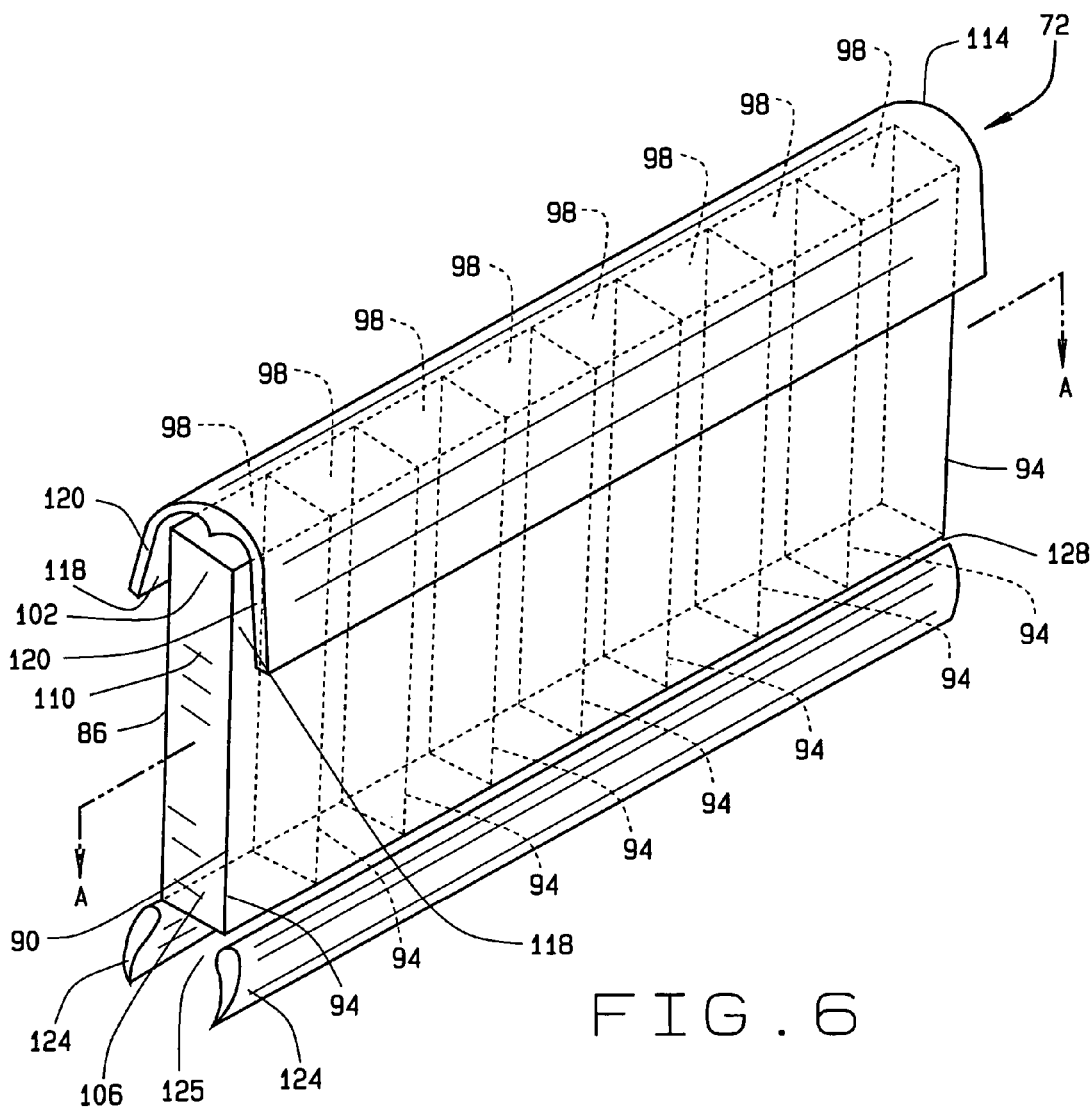
FIG. 6 is an isometric view of a linear acoustic pulsejet (LAP), in accordance with various embodiments of the present invention.
Figure 6A:
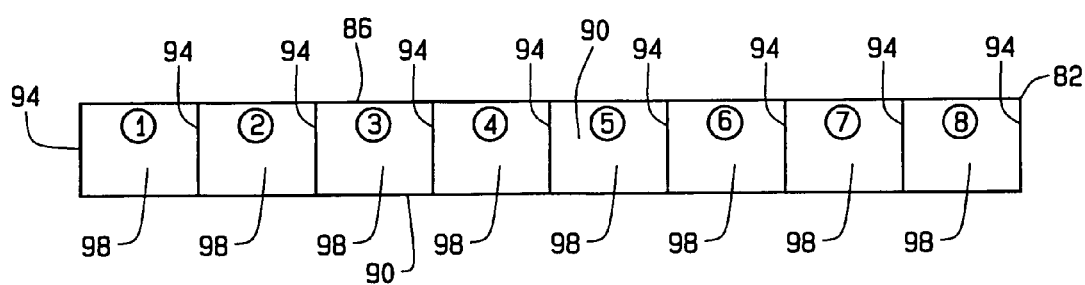
FIG. 6A is a cross-sectional view of the LAP shown in FIG. 6, along line A-A.
Figure 6B:
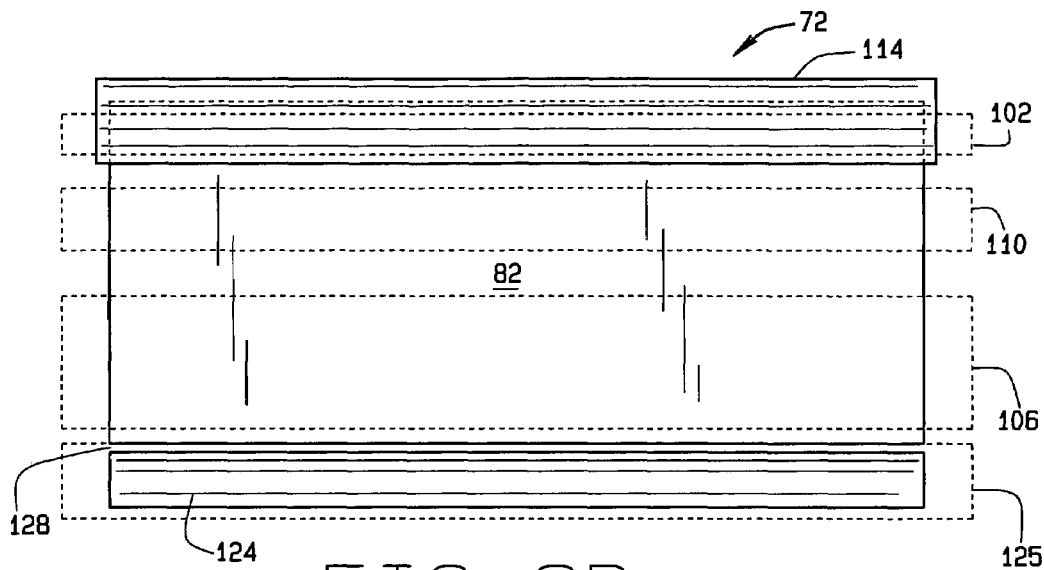
FIG. 6B is a side view of the LAP shown in FIG. 6.
Figure 6C:
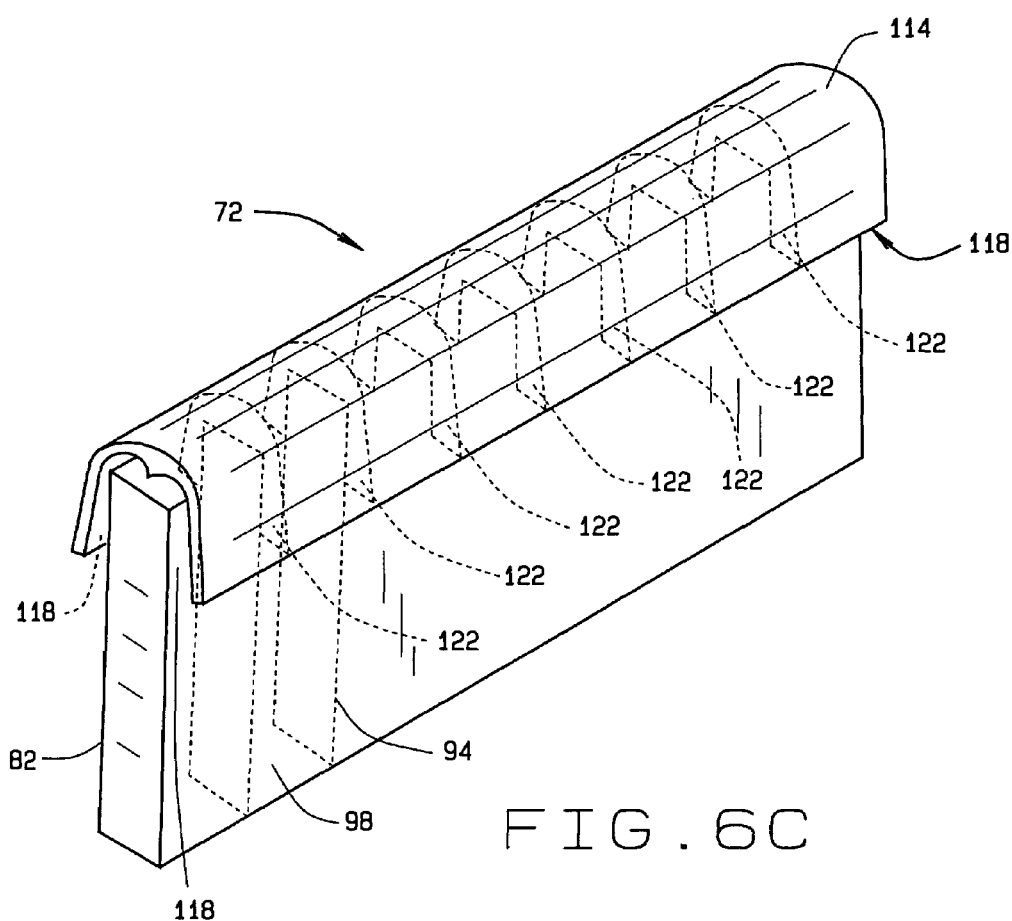
FIG. 6C is an isometric view illustrating a plurality of dividers in a linear helmet of the LAP shown in FIG. 6.
Figure 7:
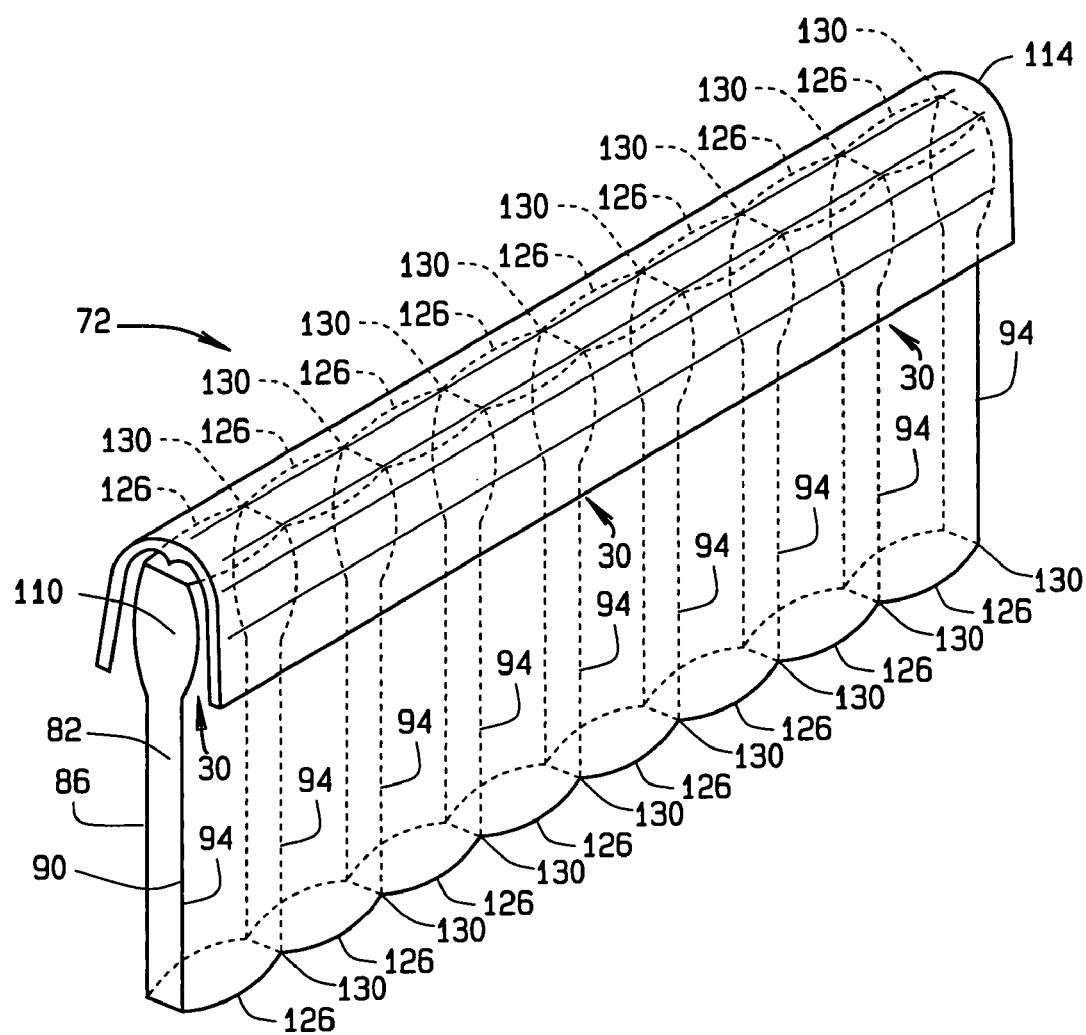
FIG. 7 is an isometric view of the LAP shown in FIG. 6 having undulating side panels, in accordance with various embodiments of the present invention.
Figure 7A:
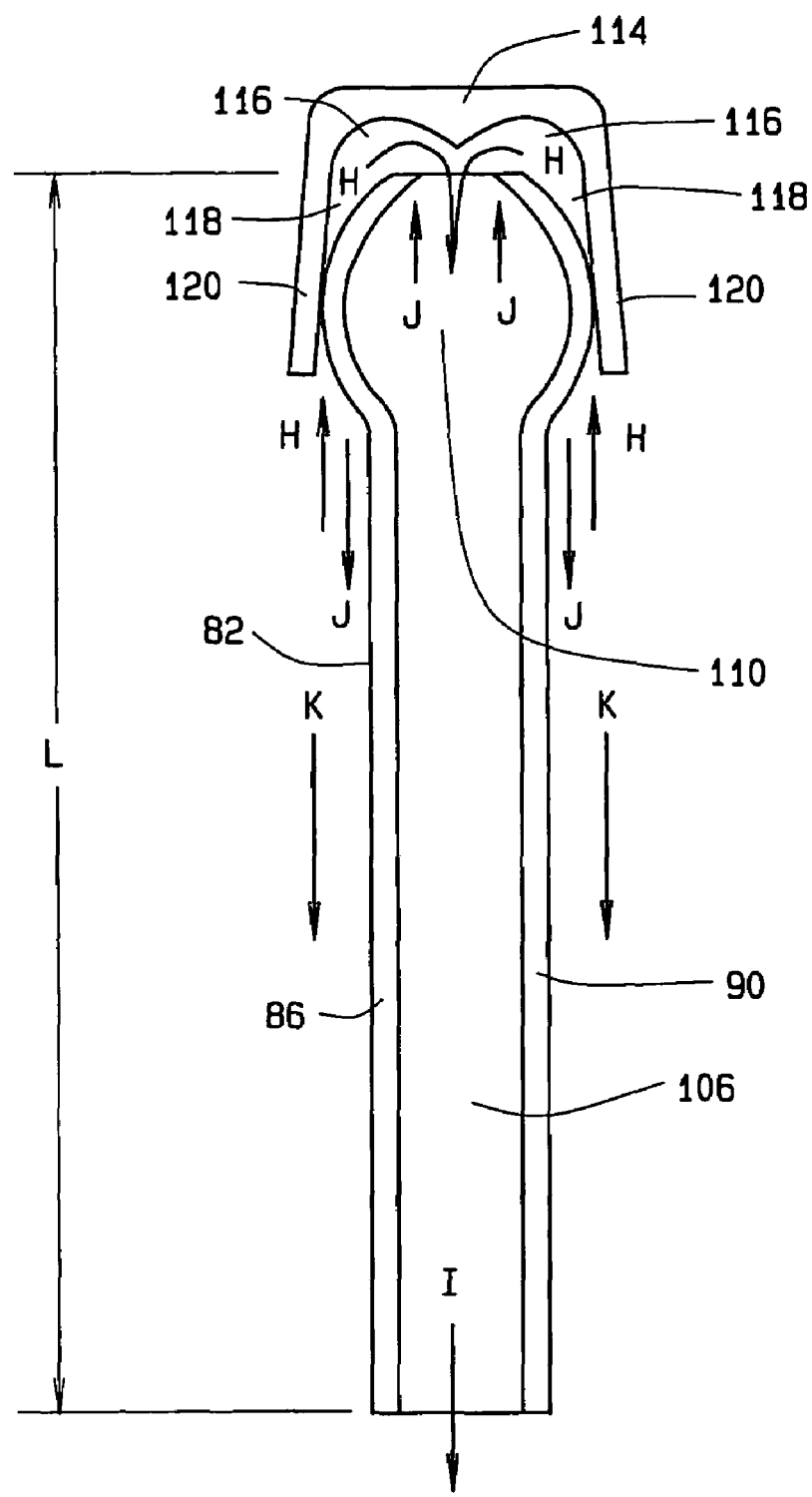
FIG. 7A is an end view of the LAP shown in FIG. 7.

Referring now to FIGS. 6, 6A, 6B, 7 and 7A a linear acoustic pulsejet (LAP) 72 includes a body 82 having a first side panel 86 and an opposing substantially parallel second side panel 90. A plurality of substantially parallel intermediate walls, or intercostals 94, are connected to and substantially orthogonally between each of the first and second side panels 86 and 90 to create a plurality of pulsejet cells 98 in an interior of the body 82. The LAP 72 additionally includes an inlet section 102 that forms an inlet for each pulsejet cell 98, an exhaust nozzle section 106 that forms an exhaust nozzle for each pulsejet cell 98, and a combustion chamber section 110 that forms a combustion chamber between the inlet and the exhaust nozzle of each pulsejet cell 98. The inlet, exhaust and combustion sections 102, 106 and 110 are best shown in FIG. 6B. The inlet, exhaust nozzle and combustion chamber of each pulsejet cell 98 will be respectively referred to herein as inlet 102', exhaust nozzle 106' and combustion chamber 110'. The LAP 72 further includes a linear inlet helmet or inlet cap 114 positioned over and connected to an end of the inlet section 102. A linear air flow pathway (LAFP) 118, best shown in FIG. 7A, is formed between opposing walls 120 of the linear helmet 114 and the inlet section 102 through which air flows into and out of each pulsejet cell 98. For clarity of FIGS. 6, 6A, 6C and 7, the side panels 86 and 90, and the intercostals 94 are illustrated by a single solid or dashed line. However, it should be understood that the side panels 86 and 90, and the intercostals 94 have a thickness sufficient to withstand the heat, stresses and forces the panels 86 and 90, and the intercostals 94 are exposed to during operation of the aircraft and the LAG 72.

In operation of the LAP 72, each pulsejet cell 98 operates independently of the other pulsejet cells 98. For each pulsejet cell 98 one propulsion cycle comprises an air intake phase, a compression phase and a combustion phase. Generally, during the compression phase, intake air flows through the LAFP 118 in the H direction and enters the inlets 102' of the respective pulsejet cell 98. The intake air is mixed with fuel injected into the respective pulsejet cell 98 combustion chambers 110' and detonated during the combustion phase. Initially, air is injected into each combustion chamber 110' to mix with the injected fuel and an ignition source is provided to cause the air/fuel mixture to combust during at least one initial combustion phase. Reflective pressure waves generated by each air/fuel combustion create pressures within the combustion chambers 110' that cause subsequent air/fuel mixtures to detonate during subsequent propulsion cycles. That is, further artificial ignition, e.g. a glow plug or spark plug, is not required.

Each air/fuel combustion produces exhaust thrust that discharges from the respective exhaust nozzles 106' in an I direction and exhaust thrust that exits the respective combustion chambers 110' through the respective inlets 102' in the J direction. Exhaust thrust discharging via each pulsejet cell nozzle 106' will be referred to herein as the LAP primary exhaust thrust or primary thrust and exhaust thrust exiting via the pulsejet cell inlets 102' will be referred to herein as the LAP secondary exhaust thrust or secondary thrust. In various embodiments, the linear helmet 114 forms the LAFP 118 to have an approximately 180° turn section 116. The 180° section effectively turns the secondary exhaust thrust 180° such that both the LAP 92 primary and secondary thrusts flow along a plane of positive thrust in the K direction that is approximately parallel with the LAP 92 first and second side panels 86 and 90. Additionally, in various embodiments, the LAP 92 is operated such that each pulsejet cell 98 is operated effectively 180° out of phase with adjacent pulsejet cells 98. For example, if the LAP 92 included eight pulsejet cells 98 sequentially numbered from one end of the LAP 92 as pulsejet cells 1, 2, 3, 4, 5, 6, 7 and 8, as illustrated in FIG. 6A, pulsejet cells 1, 3, 5 and 7 would substantially simultaneously operate 180° out of phase with the substantially simultaneous operation of pulsejet cells 2, 4, 6 and 8. More particularly, when pulsejet cells 1, 3, 5 and 7 are in the compression phase of the propulsion cycle, pulsejet cells 2, 4, 6 and 8 are substantially simultaneously in the combustion phase, and vice versa.

Furthermore, when the air/fuel mixture combusts in the combustion chamber sections 110' of each pulsejet cells 98, the high pressure primary exhaust is discharged from the respective nozzle sections 106' creating a high pressure zone at the end of each respective nozzle section 106'. Because all adjacent pulsejet cells 98 are 180° out of phase, the adjacent pulsejet cells 98 are substantially simultaneously in the compression phase drawing air into the respective combustion chamber sections via the LAFP 118. As previous combustion results in reduced combustion chamber pressures a significant pressure differential exists between the respective combustion chambers 110' and the ends of the respective nozzles 106'. More significantly, by having the adjacent pulsejet cells 98 180° out of phase, the high pressure zones at the end of pulsejet cells 98 in the compression phase is multiplied due to the adjacent pulsejet cell(s) 98 simultaneously discharging primary exhausts. Thus, the pressure differential between the respective combustion chambers 110' and the ends of the respective nozzles 106' is multiplied. This increased or multiplied pressure differential will create significantly larger compressive forces within each combustion chamber section 110' during the respective compression phases and generate higher combustion efficiency for each pulsejet cell 98.

As best shown in FIG. 6C, the linear helmet 114 includes a plurality of dividers (webbing) 122 that are located within the linear helmet 114 to substantially align with the intercostals 94. The dividers 122 direct air/exhaust flow into and away from the individual pulsejet cells 98 through the LAFP 118. In various embodiments, the LAP 72 includes a pair of linear nozzle flaps 124 located at the end of the nozzle section 106, shown in FIG. 6, that pivot to control the primary exhaust flow exiting each pulsejet cell 98. The nozzle flaps 124 are pivotal between a closed position, in which the exhaust nozzles 106' of each pulsejet cell 98 are completely closed off, and in a full open position, in which the nozzle flaps direct entrained airflow through flap gaps 128 between the nozzle flaps 124 and the nozzle section 106.

Referring particularly now to FIGS. 7 and 7A, in various embodiments the first and second side panels 86 and 90 of body 82 have an undulating, i.e. wave-like or corrugated, form having a plurality of linear ridges 126 and linear valleys 130 that extend a height L of the body 82 . Each of the intercostals 94 connects between the first and second side panels 86 and 90 at opposing linear valleys 130 so that each pulsejet cell 98 has a quasi-cylindrical or quasi-oval form. That is, each pulsejet cell 98 will have opposing curved walls comprising respective portions of the first and second side panels 86 and 90 and opposing flat walls comprising two of the intercostals 94. Alternatively, the first and second side panels 86 and 90 could have an undulating form only at the combustor section 110 of the LAP 82. The linear valleys 130 provide AFPs 30 between the linear helmet 114 and the exterior of the body side panels 86 and 90 that allow increased air flow into and out of each pulsejet cell inlet 102'.

Figure 8:
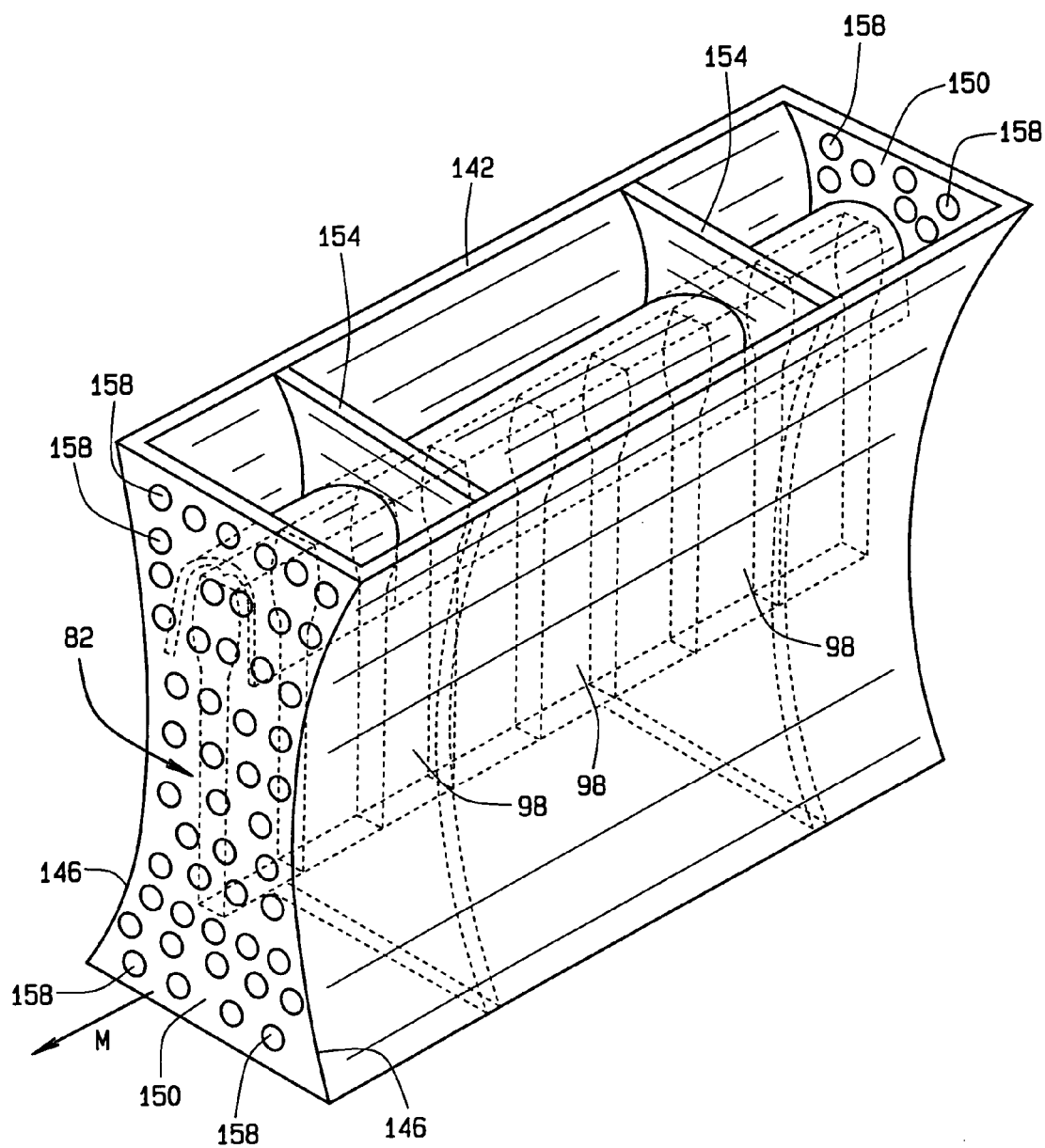
FIG. 8 is an isometric view of the LAP shown in FIG. 6 mounted in a LAP augmentor, in accordance with various embodiments of the present invention.

Referring now to FIG. 8, in various embodiments, the LAP 82 is mounted within a LAP augmentor 142. The LAP augmentor 142 includes a pair of opposing entraining walls 146 adapted to entrain ambient air combined with the LAP 82 primary and secondary exhausts to maximize propulsion thrust from each of the pulsejet cells 98. The entrainment walls 146 can have any shape suitable to entrain the ambient air. For example, the entrainment walls 146 can be flat or the entrainment walls 146 can be curved, as shown in FIG. 8. The LAP augmentor 142 additionally includes a pair of opposing end walls 150 connected to and substantially orthogonally between the entraining walls 146. The LAP 82 can be mounted within the LAP augmentor 142 using any suitable mounting means, component, device or structure. For example, the LAP 82 can be mounted to one or more of the LAP augmentor entraning walls 146 and/or the end walls 150 using one or more of bridge fairings 154. In various embodiments, the end walls 150 include a plurality of apertures 158 adapted to allow a portion of the entrained air and the LAP primary and secondary exhausts to exit the LAP augmentor 142 in a cross flow direction M.

The LAP 82 is connected to the LAP augmentor 142 such that unimpeded planar gaps or spaces are created between the entraining walls 146 and the LAP side panels 86 and 90. Entraining low velocity ambient air with the high pressure, high velocity primary and secondary exhaust of each pulsejet cell 98, will substantially increase the thrust generated by each pulsejet cell 98. For example, the LAP augmentor 142 can effectively double the thrust generated by each pulsejet cell 98. It should be understood that it is with the scope of the invention for the augmentor 142 to include the embodiment of the LAP 82 illustrated in FIG. 6.

Figure 8A:
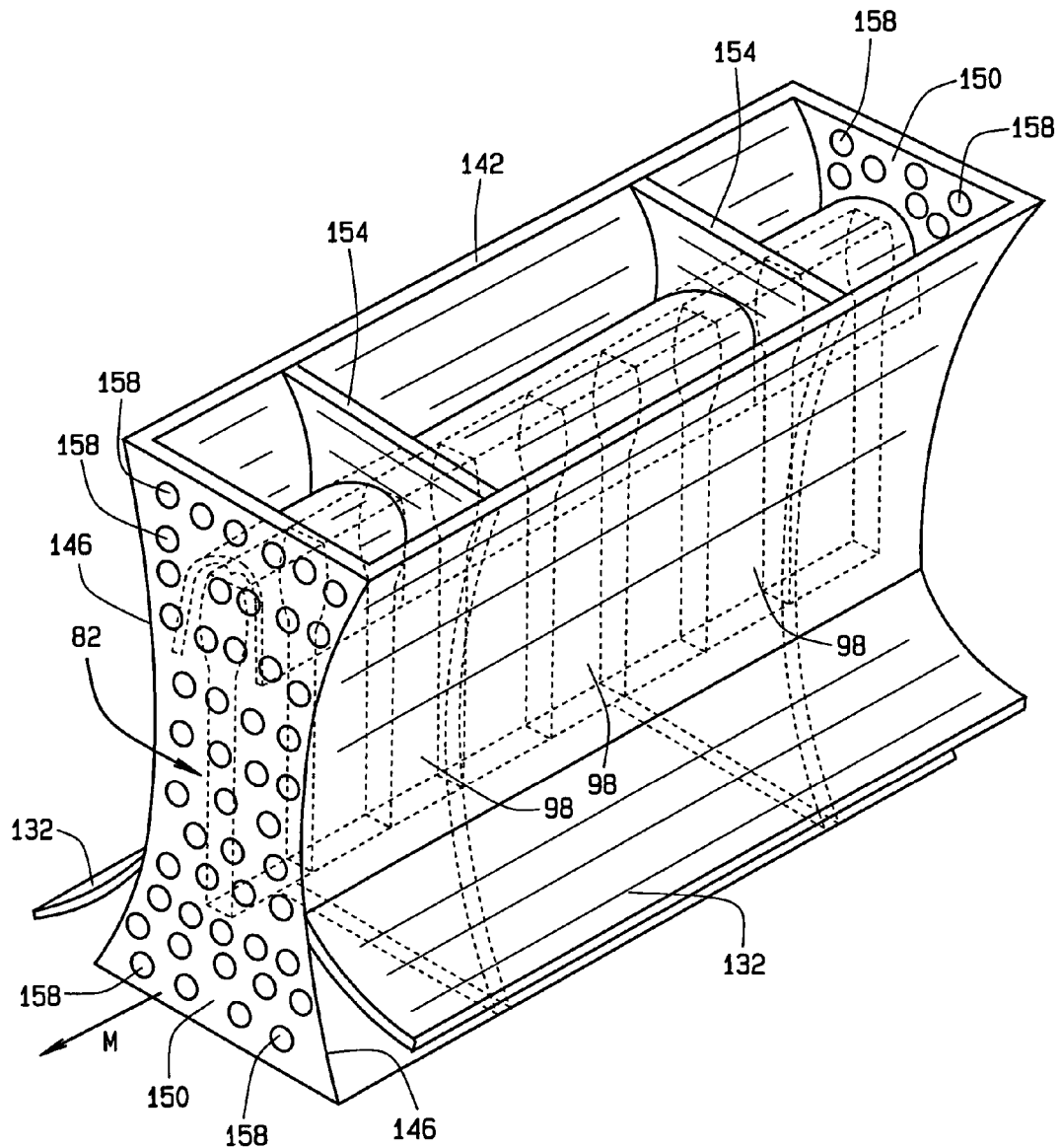
FIG. 8A is an isometric view of the LAP shown in FIG. 8 including auxiliary inlets in the LAP augmentor, in accordance with various embodiments of the present invention.

FIG. 8A is an isometric view of the LAP 82 and LAP augmentor 142, wherein the augmentor entraining walls 146 include auxiliary inlet flaps 132, in accordance with various embodiments of the present invention. The inlet flaps 132 are pivotal between a closed position, in which the entraining walls 146 substantially have the form shown in FIG. 8, and various open positions in which an auxiliary air intake opening 164 is provided. The size of the auxiliary air intake opening 164 is variable based on the position of the auxiliary inlet flaps 132. The auxiliary air intake openings allow auxiliary air flows into the LAP augmentor 142 that supply intake air to the LAP 82. When the auxiliary inlet flaps 132 are in the closed position, all air supplied to the LAP 82 is provided through the open top of the LAP augmentor 142. Depending on the open position of the auxiliary inlet flaps 132, air supplied to the LAP 82 via the open top of the LAP augmentor 142 will be varyingly reduced. That is, the further open the auxiliary inlet flaps 132 are, the more air will be supplied to the LAP 82 through the auxiliary air intake opening 164. This allows the air flowing through the top of the LAP augmentor 142 to increasingly be used to cool the LAP 82. The auxiliary inlet flaps 132 and the auxiliary air intake opening 164 can be of various designs to accommodate specific aircraft integration, and remain within the scope of the invention.

For clarity of FIG. 8, the side panels 86 and 90, and the intercostals 94 of the LAP 82 are illustrated by a single solid or dashed line. However, it should be understood that the side panels 86 and 90, and the intercostals 94 have a thickness sufficient to withstand the heat, stresses and forces the panels 86 and 90, and the intercostals 94 are exposed to during operation of the aircraft and the LAP 82. Additionally, in various embodiments, the LAP augmentor 142 is incorporated into the structural framework of the aircraft, e.g. a VTOL aircraft, as an integral load bearing structural member of the aircraft. For example, in various embodiments the LAP augmentor entraining walls 146 and the LAP side panels 86 and 90 can functions as keel structures of an aircraft fuselage and the bridge fairings 154 can also function as a load bearing structure for such things as propulsion and/or aircraft loads. In various embodiments, a plurality of LAPs 82 including LAP augmentors 142 can be joined side-by-side. In which case the center augmentor wall 146 could be omitted or formed as a flat partition between the LAPs 82.

Figure 9:
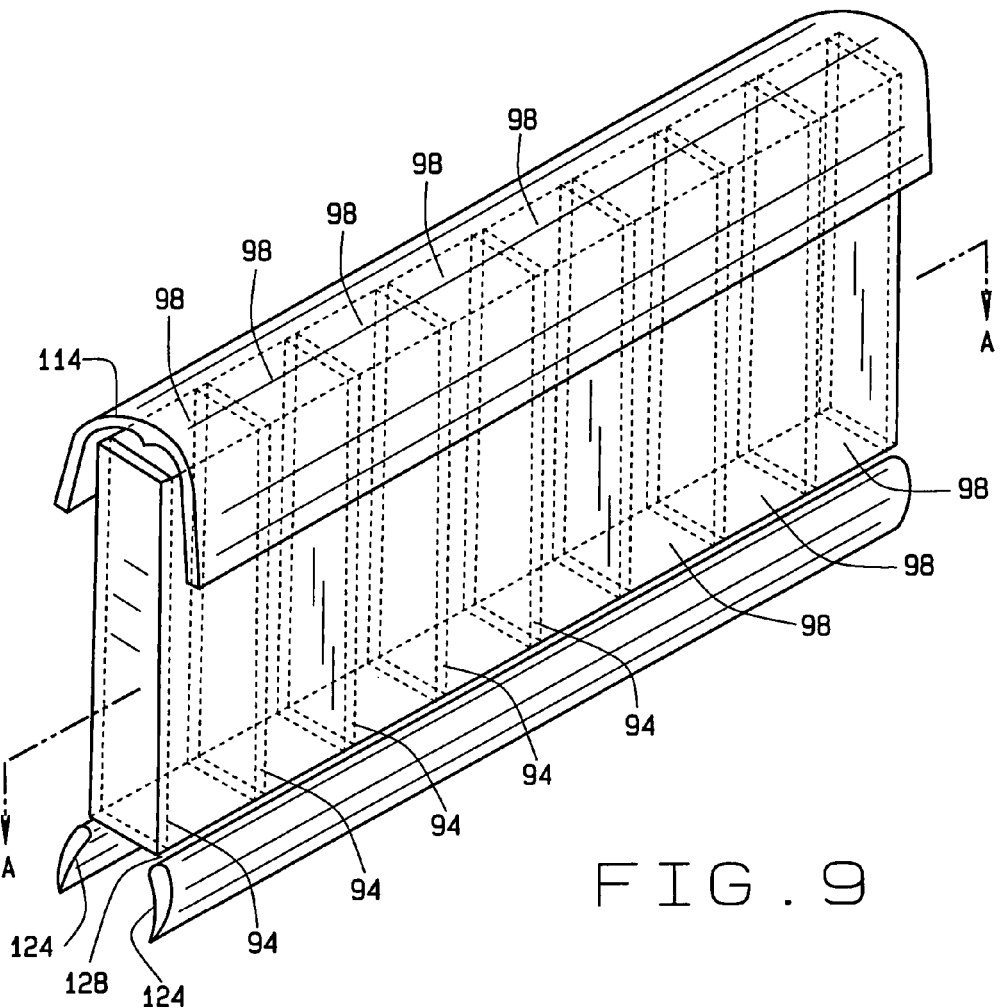
FIG. 9 is an isometric view of the LAP shown in FIG. 6 including double walled intercostals, in accordance with various embodiments of the present invention.
Figure 9A:
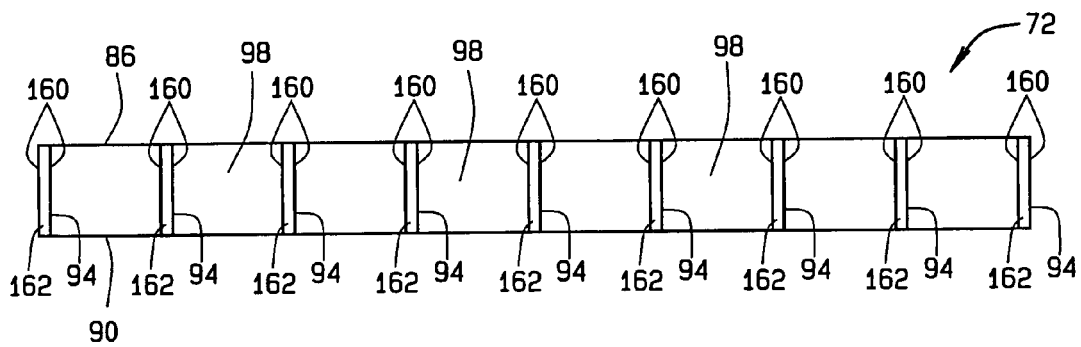
FIG. 9A is a cross-sectional view of the LAP shown in FIG. 9, along line A-A.
Figure 9B:
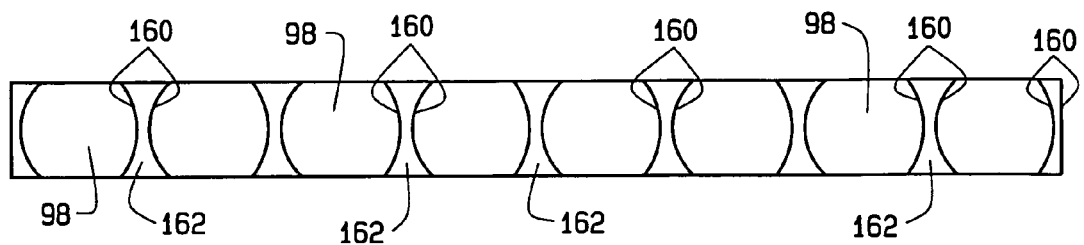
FIG. 9B is the cross-section shown in FIG. 9A having walls of double walled intercostals forming rounded corner for the pulsejet cells.
Figure 9C:
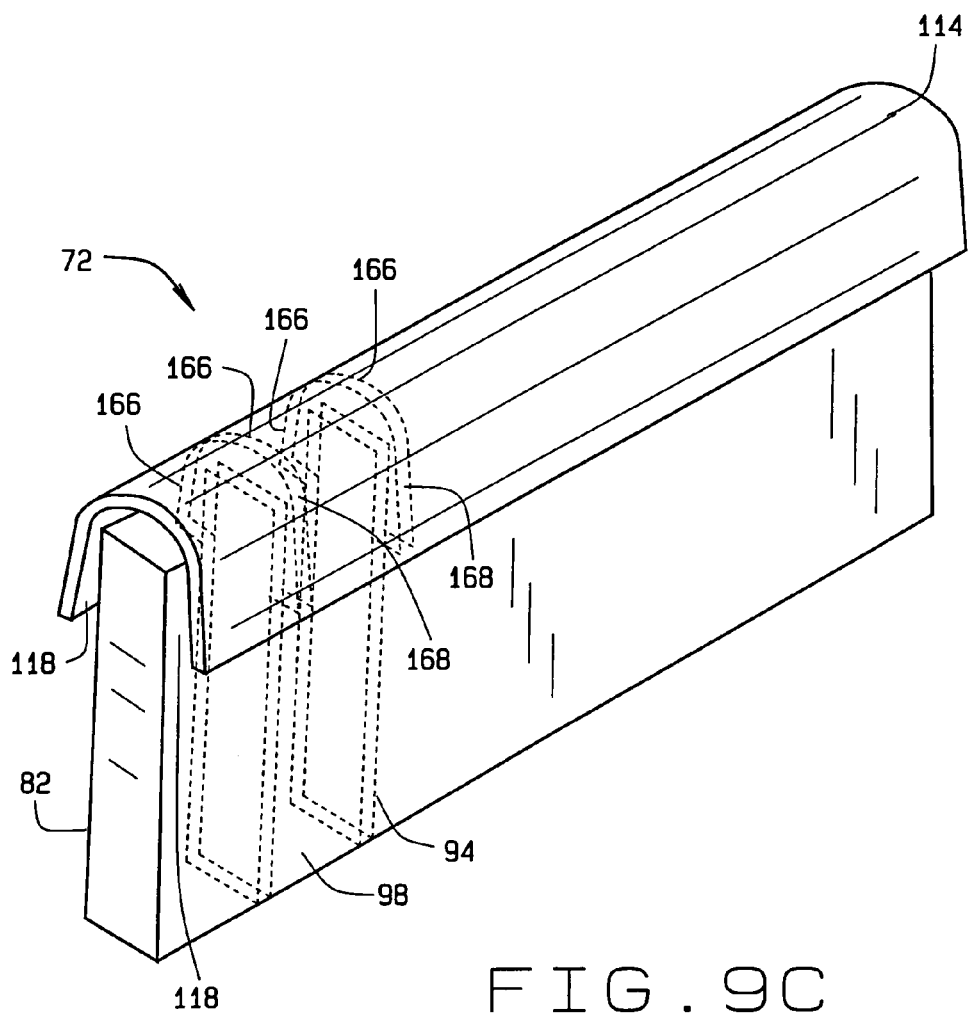
FIG. 9C is an isometric view illustrating a plurality of double-walled dividers in the linear helmet of the LAP shown in FIG. 9.

Referring now to FIGS. 9, 9A, 9B and 9C in various embodiments, intercostals 94 are double walled partitions having a pair of walls 160. In various other embodiments, the walls 160 have an air gap 162 between them through which cooling air passes to cool the pulsejet cells 98. Cooling the pulsejet cells 98 adds to the life or survivability of the material used to fabricate the LAP 82 and to reduce the absorption of heat into the aircraft structure. Additionally, the helmet dividers 122 are double walled dividers having a pair of walls 166 and an air gap 168 between the walls 166 through which air can flow into the double walled intercostals air gap 162 to cool the pulsejet cells 98, as shown in FIG. 9C. Although the intercostals air gaps 162 are illustrated in FIG. 9 to be approximately rectangular, in various embodiments the walls 160 of the double walled intercostals 94 are configured to form the pulsejet cells 98 having rounded corners, as shown in FIG. 9B. That is, the pulsejet cells will have an effectively oval cylindrical or round cylindrical shape. The rounded corners will improve the aerodynamics and combusting efficiency of the LAP 82.

Figure 10:
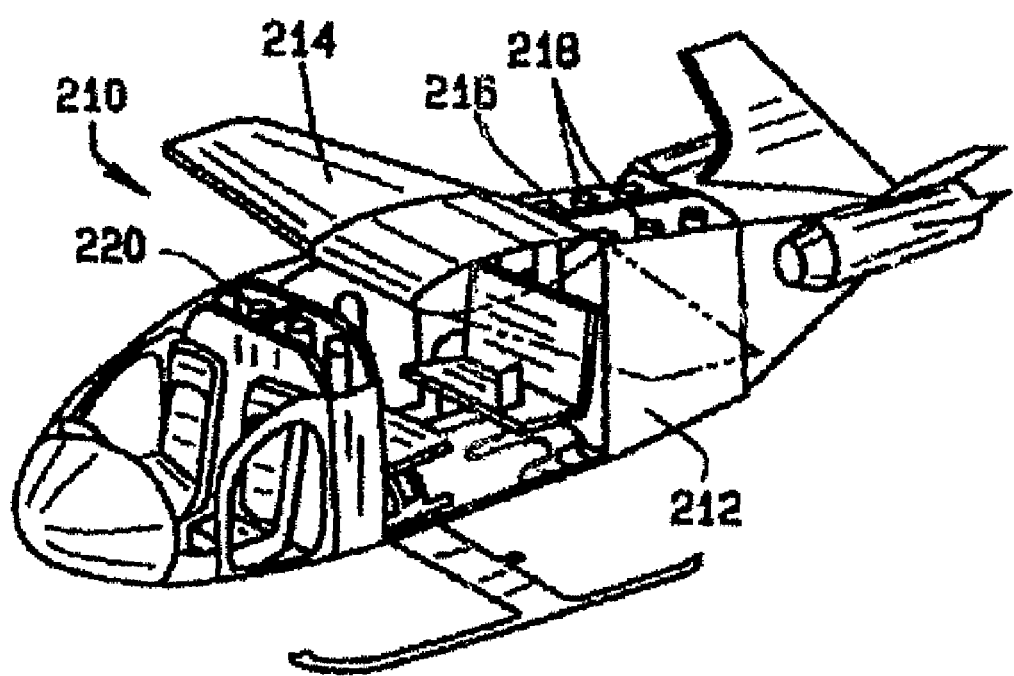
FIG. 10 is a perspective view of an exemplary aircraft having multiple banks of pulsejet engines providing for VTOL capability.

Referring to FIG. 10, an exemplary VTOL aircraft 210 is shown. The VTOL aircraft 210 structurally includes a fuselage, or body, 212 and a pair of flight wings 214. To provide VTOL capability, a plurality of pulsejet/ejector banks are provided. A pair of pulsejet/ejector aft banks 216 and a pulsejet/ejector forward bank 220 are provided. Each of the pulsejet/ejector aft banks 216 and the pulsejet/ejector forward bank 220 include a plurality of pulsejet engines 218. The pulsejet/ejector aft banks 216 and the pulsejet/ejector forward bank 220 provide vertical takeoff capability. The VTOL aircraft 210 is further described in U.S. Pat. No. 6,824,097, entitled "Vertical Takeoff and Landing Aircraft", issued Nov. 30, 2004, the disclosure of which is incorporated herein by reference in its entirety.

The LAP 82 described above provides a high thrust to weight ratio, low fuel consumption, highly effective low weight thrust system for aircraft, for example VTOL aircraft. Additionally, the LAP 82 and augmentor 142 can be incorporated as an integral load bearing structure of the aircraft. That is, the LAP 82 and augmentor 142 are totally integrated as a permanent aircraft structure used for carrying aircraft and propulsion loads. Furthermore, the linear aspects of the integration of the LAP 82 and augmentor 142, as a component of the aircraft structure, will promote more predictable mass flow entrainment characteristics.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A pulsejet comprising:
   an inlet;
   an exhaust nozzle;
   a combustion chamber between the inlet and the exhaust nozzle; and
   a flow-turning device positioned over an end of the pulsejet to form an air flow pathway (AFP) having a substantially 180° turn for aligning a direction of exhaust exiting the combustion chamber through the inlet to be substantially parallel with exhaust exiting the combustion chamber through the nozzle along a positive axial thrust line.

2. The pulsejet of claim 1, wherein the AFP ensures returning inlet reflection waves meet returning nozzle reflective waves within the combustor chamber.

3. The pulsejet of claim 1, wherein an outside diameter of a side wall of the flow-turning device is approximately 100% to 125% as long as an outside diameter of the combustion chamber.

4. The pulsejet of claim 1, wherein the pulsejet further includes a straight inlet section extending from an end of the combustion chamber opposite the exhaust nozzle, the straight inlet providing an AFP area ratio that expands as a side wall of the flow-turning device extends toward the combustion chamber and nozzle.

5. The pulsejet of claim 4, wherein the straight inlet section comprises a length to diameter ratio that acoustically tunes the straight inlet section.

6. The pulsejet of claim 1, wherein the flow-turning device is formed so that as a side wall of the flow-turning device extends toward the exhaust-nozzle, the air gap area between the flow-turning device side wall and the inlet nozzle increases to allow more air flow into the inlet during the compression phase and diffuse the exhaust exiting the combustion chamber through the inlet during the combustion phase.

7. The pulsejet of claim 1, wherein the combustion chamber has an elongated cruciform shape including a plurality of linear apexes and linear valleys that create a plurality of AFPs between a side wall of the flow-turning device and the valleys that provide effectively unimpeded air intake flow and exhaust flow into and out of the inlet.

8. A method for providing vertical take off and landing propulsion for an aircraft, said method comprising:
   providing at least one valve-less pulsejet integrated within a fuselage of the aircraft, the pulsejet including a body having an inlet, an exhaust nozzle, a combustion chamber between the inlet and the exhaust nozzle; and
   positioning a flow-turning device over an end of the pulsejet to form an air flow pathway (AFP) having a substantially 180° turn for aligning a direction of exhaust exiting the combustion chamber through the inlet to be substantially parallel with exhaust exiting the combustion chamber through the nozzle along a positive axial thrust line.

9. The method of claim 8, wherein positioning a flow-turning device over the end of the pulsejet comprises forming the flow-turning device to have an outside diameter that is approximately 100% to 125% of an outside diameter of the combustion chamber.

10. The method of claim 8, wherein providing the valve-less pulsejet comprises providing an AFP area ratio that expands as a side wall of the flow-turning device extends toward the combustion chamber and nozzle by providing a straight inlet section extending from an end of the combustion chamber opposite the exhaust nozzle.

11. The method of claim 10, wherein the straight inlet section comprises a length to diameter ratio that acoustically tunes the straight inlet section.

12. The method of claim 8, wherein positioning a flow-turning device over an end of the pulsejet comprises increasing air flow into the inlet during a compression phase and diffusing the exhaust exiting the combustion chamber through the inlet by forming the flow turning device such that an area of the AFP increases as a side wall of the flow-turning device extends toward the exhaust nozzle.

13. The method of claim 8, wherein providing at least one valve-less pulsejet comprises forming the combustion chamber to have an elongated cruciform shape including a plurality of linear apexes and linear valleys that create a plurality of AFPs between a side wall of the flow-turning device and the valleys that provide effectively unimpeded air intake flow and exhaust flow into and out of the inlet.

14. A vertical take off and landing (VTOL) aircraft, said aircraft comprising:
   a fuselage having integrated therein at least one valve-less pulsejet, the pulsejet comprising:
   a body having an inlet, an exhaust nozzle, a combustion chamber between the inlet and the exhaust nozzle;
   a flow-turning device positioned over an end of the pulsejet to form an air flow pathway (AFP), the flow-turning device adapted to direct intake air flow into the inlet and exhaust flow exiting the combustion chamber through the inlet; and
   an augmentor cell connected to the body, the augmentor cell including a pair of opposing entraining walls adapted to entrain ambient air with exhaust flows of the pulsejet to maximize a propulsion thrust from the pulsejet.

15. The aircraft of claim 14, wherein the flow-turning device forms the AFP to have a substantially 180° turn for aligning a direction of the exhaust exiting the combustion chamber through the inlet to be substantially parallel with exhaust flow exiting the combustion chamber through the nozzle along a positive axial thrust line.

16. The aircraft of claim 14, wherein the AFP ensures returning inlet reflection waves meet returning nozzle reflective waves within the combustor chamber.

17. The aircraft of claim 14, wherein an outside diameter of a side wall of the flow-turning device is approximately 100% to 125% as long as an outside diameter of the combustion chamber.

18. The aircraft of claim 14, wherein the pulsejet further includes a straight inlet section extending from an end of the combustion chamber opposite the exhaust nozzle, the straight inlet providing an AFP area ratio that expands as a side wall of the flow-turning device extends toward the combustion chamber and nozzle.

19. The aircraft of claim 18, wherein the straight inlet section comprises a length to diameter ratio that acoustically tunes the straight inlet section.

20. The aircraft of claim 14, wherein the flow-turning device is formed so that as a side wall of the flow-turning device extends toward the exhaust-nozzle, the air gap area between the flow-turning device side wall and the inlet nozzle increases to allow more air flow into the inlet during the compression phase and diffuse the secondary exhaust during the combustion phase.

21. The aircraft of claim 14, wherein the combustion chamber has an elongated cruciform shape including a plurality of linear apexes and linear valleys that create a plurality of AFPs between a side wall of the flow-turning device and the valleys that provide effectively unimpeded air intake flow and exhaust flow into and out of the inlet.

* * * * *

UNITED STATES PATENT AND TRADEMARK OFFICE
CERTIFICATE OF CORRECTION

| | |
|---|---|
| PATENT NO. | : 7,581,383 B2 |
| APPLICATION NO. | : 11/190263 |
| DATED | : September 1, 2009 |
| INVENTOR(S) | : Richard P Ouellette |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1025 days.

Signed and Sealed this

Fourteenth Day of September, 2010

David J. Kappos
*Director of the United States Patent and Trademark Office*